US007908150B2

(12) United States Patent
Rochet

(10) Patent No.: US 7,908,150 B2
(45) Date of Patent: Mar. 15, 2011

(54) SYSTEM AND A METHOD FOR PERFORMING PERSONALISED INTERACTIVE AUTOMATED ELECTRONIC MARKETING OF THE MARKETING SERVICE PROVIDER

(76) Inventor: Jean-Luc Rochet, Walhain-Saint-Paul (BE)

( * ) Notice: Subject to any disclaimer, the term of this patent is extended or adjusted under 35 U.S.C. 154(b) by 1380 days.

(21) Appl. No.: 10/476,486

(22) PCT Filed: May 3, 2002

(86) PCT No.: PCT/EP02/04958
§ 371 (c)(1),
(2), (4) Date: May 24, 2004

(87) PCT Pub. No.: WO02/091252
PCT Pub. Date: Nov. 14, 2002

(65) Prior Publication Data
US 2004/0204952 A1    Oct. 14, 2004

(30) Foreign Application Priority Data

May 7, 2001 (NL) ..................................... 1018008

(51) Int. Cl.
*G06Q 10/00* (2006.01)
*G06Q 30/00* (2006.01)
(52) U.S. Cl. ................... 705/1.1; 705/14.67; 705/14.73; 705/10; 705/14.39; 705/14.44; 705/14.49; 705/14.64
(58) Field of Classification Search .................... 705/14, 705/10, 14.39, 14.44, 14.49, 14.64
See application file for complete search history.

(56) References Cited

U.S. PATENT DOCUMENTS

| | | | | | |
|---|---|---|---|---|---|
| 5,125,075 | A | * | 6/1992 | Goodale et al. | ............... 709/206 |
| 5,623,666 | A | * | 4/1997 | Pike et al. | ..................... 707/200 |
| 5,815,707 | A | * | 9/1998 | Krause et al. | ................. 719/321 |
| 5,983,200 | A | * | 11/1999 | Slotznick | ......................... 705/26 |
| 6,055,513 | A | * | 4/2000 | Katz et al. | ........................ 705/26 |
| 6,065,120 | A | * | 5/2000 | Laursen et al. | .................... 726/5 |

(Continued)

FOREIGN PATENT DOCUMENTS
EP            1 146 701         10/2001
(Continued)

*Primary Examiner* — John G Weiss
*Assistant Examiner* — Adam Chornesky
(74) *Attorney, Agent, or Firm* — Oblon, Spivak, McClelland, Maier & Neustadt, L.L.P.

(57) ABSTRACT

The new system and method for performing personalized interactive automated electronic marketing of the marketing service provider being utilized by product vendors and end users. A business-to-business subscription system between the marketing service provider and a plurality of product vendors is established. This system integrates the conventional media, e.g. TV, radio and newspapers, the modern information society tools, e.g. mobile phone technology, personal computers and Internet. Product vendors are now provided with a powerful and effective marketing tool, while end users are provided with personalized desired data acquisition and the tool for purchasing on the safe and timely manner. The new system improves the commercial request response rate by simultaneously avoiding the sales leads' losses and transforming the cold sales leads into the hot sales leads. It ultimately results in that AIDA cycle of the end user with regard to the product will become substantially shortened.

6 Claims, 1 Drawing Sheet

U.S. PATENT DOCUMENTS

| | | | |
|---|---|---|---|
| 6,076,080 A * | 6/2000 | Morscheck et al. | 705/400 |
| 6,202,062 B1 * | 3/2001 | Cameron et al. | 707/3 |
| 6,356,905 B1 * | 3/2002 | Gershman et al. | 707/10 |
| 6,477,575 B1 * | 11/2002 | Koeppel et al. | 709/224 |
| 6,816,721 B1 * | 11/2004 | Rudisill | 455/406 |
| 6,892,196 B1 * | 5/2005 | Hughes | 707/4 |
| 6,980,670 B1 * | 12/2005 | Hoffman et al. | 382/115 |
| 7,010,497 B1 * | 3/2006 | Nyhan et al. | 705/14.44 |
| 7,194,422 B1 * | 3/2007 | St. John Killick | 705/14 |
| 7,280,979 B1 * | 10/2007 | Katz et al. | 705/26 |
| 7,315,983 B2 * | 1/2008 | Evans et al. | 715/713 |
| 7,453,998 B2 * | 11/2008 | Jacob et al. | 379/114.05 |
| 7,505,935 B2 * | 3/2009 | Mendiola et al. | 705/37 |
| 2001/0001854 A1 * | 5/2001 | Schena et al. | 705/27 |
| 2001/0049274 A1 * | 12/2001 | Degraeve | 455/412 |
| 2002/0046040 A1 * | 4/2002 | Kirner | 705/1 |
| 2002/0052811 A1 * | 5/2002 | Hoins | 705/34 |
| 2002/0062251 A1 * | 5/2002 | Anandan et al. | 705/14 |
| 2002/0087408 A1 * | 7/2002 | Burnett | 705/14 |
| 2004/0204952 A1 * | 10/2004 | Rochet | 705/1 |
| 2006/0079211 A1 * | 4/2006 | Degraeve | 455/412.1 |
| 2010/0042546 A1 * | 2/2010 | Humbel | 705/64 |
| 2010/0057561 A1 * | 3/2010 | Gifford | 705/14.49 |

FOREIGN PATENT DOCUMENTS

| | | | |
|---|---|---|---|
| EP | 1172976 A1 * | 1/2002 | |
| EP | 1418773 A2 * | 5/2004 | |

\* cited by examiner

SYSTEM AND A METHOD FOR PERFORMING PERSONALISED INTERACTIVE AUTOMATED ELECTRONIC MARKETING OF THE MARKETING SERVICE PROVIDER

The new system and a method for performing personalised interactive automated electronic marketing of the marketing service provider being utilized by product vendors and end users whereby a so-called business-to-business subscription system between the marketing service provider and a plurality of product vendors is established. This system integrates the conventional media, e.g. TV, radio and newspapers, the modern information society tools, e.g. mobile phone technology, personal computers and Internet, in order to provide product vendors with a powerful and effective marketing tool and end users with personalised desired data acquisition and the tool for purchasing on the safe and timely manner.

The development of planning and executing of the conception, pricing, promotion and distribution of products in order to create sale/purchasing activities between product vendors and end users faces at present difficulties with regard to the e-commerce. At present the consumers show an unsatisfactory level of confidence in e-commerce regarding efficiency (product need to be seen, smelled, heard, etc.) and security (safe data transfers and transactions with guaranteed privacy) resulting in that the large majority of product vendors remain to carry out the expensive conventional marketing operations, e.g. advertising products in the media, printing catalogues and brochures and performing other direct or indirect labour-intensive marketing activities.

The modern products envisaged for automated marketing can be listed, but not limited to, as follows:
a) high value-added products with a high technological content;
b) status-linked products where technology and/or branding take precedence and whose life expectancy is very limited;
c) products related to the individualization of the lifestyles and lowering of the consumer fidelity due to diminishing of traditional social structures.

Additionally, the actual purchasing of the products currently undergoes maximisation of the shopping proximity due to increasing traffic congestion and minimisation of the distributor margins in an ever-increasing competition. The growing conception of the new products is quickening, promotion is adapting to new medias while the international distribution is increasing the logistics complexity. For accessing the product data in the prior art potential end-user need to carry out time-consuming data search by means of either checking printed sources of information, web surfing the Internet or simply consulting shop personnel (that is progressively being less skilled or able to provide potential end-user with desired information) in the shop. In other words the so-called "attraction, interest, desire and action" (AIDA) cycle of the end user with regard to the product is long and therefore difficult for the marketing service to separate and analyse the hot lead sales items versus the cold lead sales items.

Failing to address these aspects as well as to recognize the need for constant marketing improvement results in that the businesses of the related product suppliers will lose competitive edge and their existence will be endangered.

The new system and a method for performing personalised interactive automated electronic marketing of the marketing service provider, according to invention, which is utilized by product vendors, advertising agencies and end users whereby a so-called business-to-business subscription system between the marketing service provider and a plurality of product vendors is established primarily improves the commercial request response rate by simultaneously avoiding the sales leads' losses and transforming the cold sales leads into the hot sales leads by which AIDA cycle of the end user with regard to the product is substantially shortened.

The desired format and the desired visualisation of the product data are being decided upon- and personalised by the end-user who may decide whether the requested data information is presented in the form of a fax, an e-mail or via an adjustable internet website subsequently decreasing product advertising costs making, among others, printing of catalogues, folders and/or other product brochures on the paper or the like superfluous. The end-users actions related to the product data requests may be recorded (e.g. number of requests or types of products of interest) and therefore enabling end-user's response chain history to be traceable and assessable for the supplier of the products.

Description of the whole personalised interactive marketing system according to invention through the particular descriptions of its essential elements is given below.

The personalised interactive marketing system according to invention consists of, but not limited to, the following elements:
a) product coding system applied to the advertised and publicised products whereby each product is provided with an unique alphanumerical code, such as a name and/or number which is integrated in the appearance of the said product;
b) management (issuing, providing and maintaining) of the codes owned by the marketing service provider, which management forms the basis for the said subscription system with the product suppliers and advertising agencies;
c) at least one unit of the mobile telecommunication apparatus, such as a mobile phone, connected to the mobile network and capable of electronically transferring the data over internet, e.g. via SMS gateway,
d) at least one PC provided with, among others, an internet connection with corresponding software browser such as Netscape or Explorer, furthermore with a functionality for a personalised, reliable and safe communication and data transfer with the integral marketing website (MInfo Portal) of the marketing service provider;
e) an integral marketing website (MInfo Portal) run by the marketing operating programme (MInfo software) of the marketing service provider which is physically located at its fileserver, whereby said fileserver establishes' an authorized communication- and data traffic, with regard to the product data information requested by the end user, from the marketing database to the end-user's PC, whereby the publicised and advertised product are provided with alphanumerical codes according to the said coding system, which codes can be inputted by end-user into a mobile phone and subsequently sent to integral marketing website (MInfo Portal) via the SMS gateway.

This SMS gateway exchanges the authorisation data with the integral marketing website (MInfo Portal) of the marketing service provider by means of request related to the product data, such as general information, technical specification and price whereby the connection between PC and the integral marketing website (MInfo) initially commences by means of exchange of the authorization data such as phone number and name, respectively transmits and visualises the product data from the marketing database server to the PC, whereupon the end user at his convenience can make a choice and buy the product by means of sending a purchase order to the product vendor and/or merchant via the same integral marketing website (MInfo Portal) of the marketing service provider.

The format of, the contents (e.g. product specification with price), means of communication (e.g. website, e-mail, fax) and the volume of the product data requested by the end user are decided upon- and personalised by the user interface (e.g. through website or a mobile phone provided with a data transfer protocol).

The improvement of the marketing service obtained by implementing the new marketing system according to invention is manifested in the following:
1. From the point of view of the supplier of the products:
   1.1 quicker commercialisation of the products;
   1.2 a new combination of brand awareness with information content which compensates the need for the knowledgeable and skilled personnel in the shops, which leads to
   1.3 delivery of a rich content message to the large plurality of potential end-users (world market) through mass-customisation;
   1.4 enabling the product supplier to monitor and analyse the attitude of the end user towards the marketed products;
   1.5 decreasing the advertising costs of the products whereby printing of catalogues, folders and/or other product brochures on the paper or the like therefore becomes unnecessary, by which the savings can be converted into investments for advertising in other media.
2. From the point of view of the end user of the products:
   2.1 end user is provided with the appropriate amount of the product data for allowing easy, comprehensive and good-value purchasing decisions;
   2.2 increased overall appeal to the end-users due to the personalisation of marketing by which the predefined volume and the contents of the requested product data (originated and uploaded by supplier of the products) upon the end-user's request are sent from the marketing service provider by means of modern communication tools (e-mail, fax or via the marketing website) whereupon they can be viewed and analysed at end-user's convenience.

Figure 1:
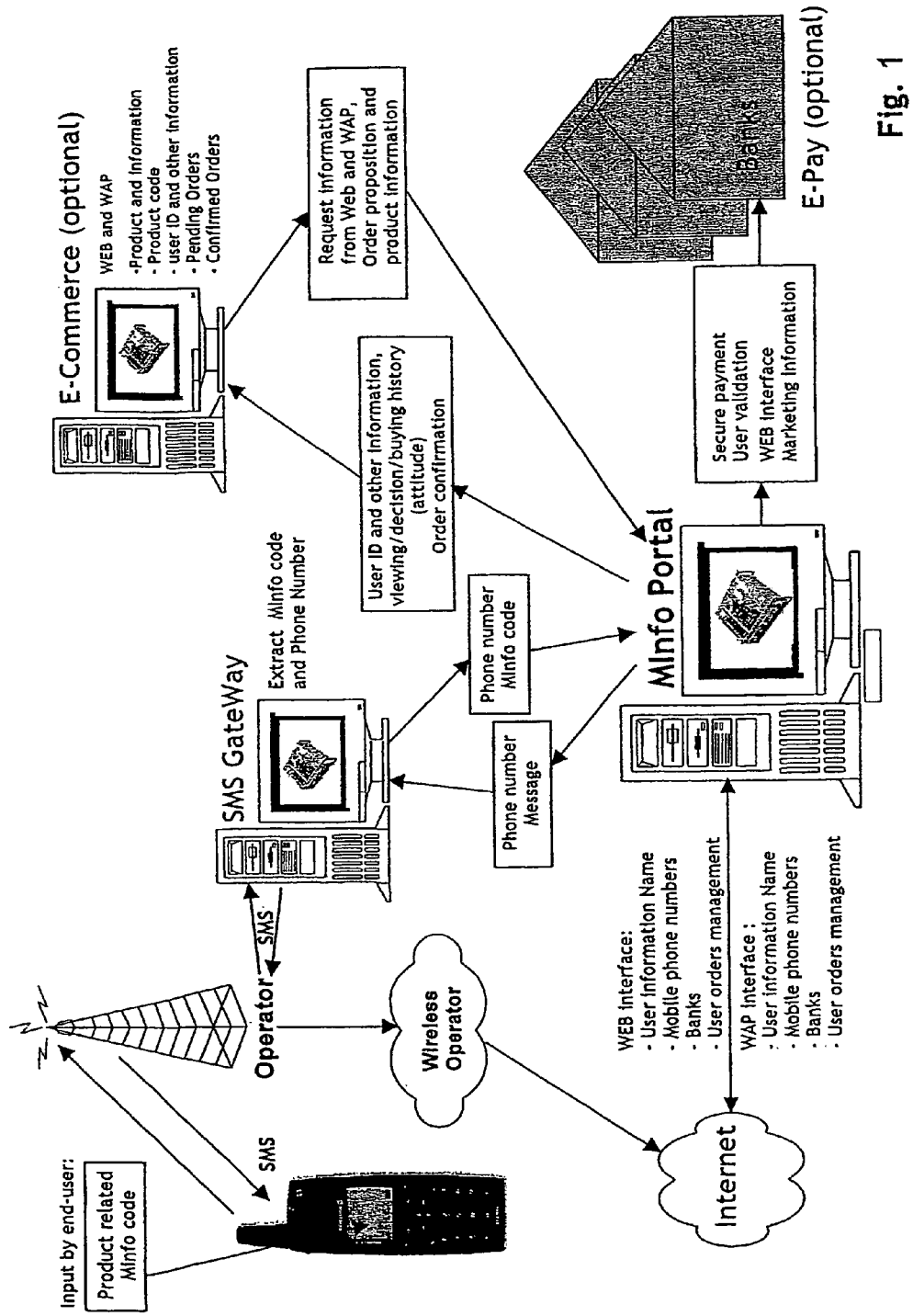
FIG. 1 is a modified block diagram of a representative hardware environment combined with the data flowchart in accordance with the new method and system for performing personalised interactive automated electronic marketing of the marketing service provider according to invention. Arrows presented in the diagram show direction(s) of communication and/or data flow between the system elements Electronic purchasing (E-commerce) and payment (E-pay) are shown as optional.

Each product is assigned an unique code, subsequently this code will be integrated and visualised on each publication and advertisement of the product appearance, e.g. in an alphanumerical form. A product code input into the mobile phone by end user is subsequently transmitted by SMS protocol to the mobile phone provider that, then, communicates with the marketing fileserver (MInfo) of the marketing provider. The product data related to the product will be transmitted through the modern communication tools (fax, e-mail and/or via end-user's homepage on the marketing website) for viewing at end-user's convenience. End-user can now make a choice and buy the product by means of sending a purchase order to the product supplier either via phone, fax, e-mail or optionally via the same integral marketing website (MInfo Portal) of the marketing service provider (E-commerce). A secure electronic payment (E-Pay) with one or more banks is also optional.

The invention claimed is:

1. A method for requesting and subsequently transmitting product data information stored in a database by an end-user by inputting a product code into a mobile phone, the method comprising:
   assigning a unique code to the product data in human readable alphanumerical form;
   integrating the code on each publication and/or advertisement of the product appearance;
   sending the product code in short message service by the end-user using a mobile phone to a short message service Gateway;
   extracting by the short message service Gateway of the code and the end-user's phone number;
   sending by the short message service Gateway of the extracted code and phone number to a Portal computer;
   creating a personalized user home-page on the Portal Computer for which access authorization data is the user's mobile phone number;
   providing of the product data information on the personalized user homepage upon the Portal Computer; and
   making connection between the PC of a user and the Portal Computer by inputting the user's mobile phone number to enable the user to view the personalized user home page.

2. The method according to claim 1, wherein the portal computer sends a short message service message to the end user's mobile phone on receipt of the alphanumeric code.

3. The method according to claim 1, the method further comprising:
   deciding by the end user upon the format of the contents, means of communication or the volume of the product data requested by means of the user interface of the website or by means of a mobile phone provided with a data transfer protocol.

4. The method according to claim 1, the method further comprising:
   buying by the end user of the product by means of the personalized portal website using secure electronic payment or E-pay.

5. A system for providing information to a user about a particular product identified by a particular alphanumeric code comprising:
   a short message service gateway configured to receive the alphanumeric code from the user by short message service, and to output the code and the user's phone number contained in the short message service;
   a web fileserver containing information about a plurality of products each identified by a respective alphanumeric code, the web fileserver being connected to the short message service gateway to receive the code and the phone number from the short message service gateway, and further being configured such that upon receipt of the code and the phone number from the short message service gateway the web fileserver generates a web page containing the information about the product identified by an alphanumeric code, and secures it by means of an authorization code comprising the phone number; and
   a PC of a user having a web browser program and connected via a network to the web fileserver, wherein the web fileserver is further configured to reveal the web page to the user upon authorization by use of the user's phone number.

6. The system according to claim 5, wherein the web fileserver is further configured to instruct the short message service gateway to send a short message service to the user on receipt of the alphanumeric code.

* * * * *